(12) United States Patent
Kato et al.

(10) Patent No.: US 8,722,137 B2
(45) Date of Patent: *May 13, 2014

(54) HYDRATED WATER-ABSORPTION POLYMER CONTAINING RESIN COMPOSITION, POROUS BODY AND INSULATED WIRE USING SAME, METHOD OF MAKING THE WIRE AND COAXIAL CABLE

(75) Inventors: Yoshihisa Kato, Hitachi (JP); Yuki Honda, Hitachi (JP); Tomiya Abe, Hitachi (JP); Takao Miwa, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 707 days.

This patent is subject to a terminal disclaimer.

(21) Appl. No.: 12/314,774

(22) Filed: Dec. 16, 2008

(65) Prior Publication Data
US 2009/0220817 A1 Sep. 3, 2009

(30) Foreign Application Priority Data
Feb. 29, 2008 (JP) .................................. 2008-050913

(51) Int. Cl.
*B05D 5/12* (2006.01)

(52) U.S. Cl.
USPC ........... 427/119; 427/120; 427/373; 427/384; 428/379

(58) Field of Classification Search
None
See application file for complete search history.

(56) References Cited

U.S. PATENT DOCUMENTS

| | | | | |
|---|---|---|---|---|
| 3,315,025 A | * | 4/1967 | Tomlinson | 174/107 |
| 3,558,801 A | * | 1/1971 | Eilhardt et al. | 174/102 R |
| 4,587,308 A | * | 5/1986 | Makita et al. | 525/373 |
| 4,767,184 A | * | 8/1988 | Ogasawara et al. | 385/105 |
| 5,175,046 A | * | 12/1992 | Nguyen | 428/198 |
| 5,322,896 A | * | 6/1994 | Ueda et al. | 525/119 |
| 5,462,972 A | * | 10/1995 | Smith et al. | 521/53 |
| 5,684,904 A | * | 11/1997 | Bringuier et al. | 385/109 |
| 5,821,179 A | * | 10/1998 | Masaki et al. | 442/375 |
| 5,985,944 A | * | 11/1999 | Ishizaki et al. | 521/64 |
| 6,103,317 A | * | 8/2000 | Asai et al. | 427/512 |
| 6,190,689 B1 | * | 2/2001 | Hoffmann et al. | 424/448 |
| 6,195,486 B1 | * | 2/2001 | Field et al. | 385/100 |
| 6,210,625 B1 | * | 4/2001 | Matsushita et al. | 264/610 |

(Continued)

FOREIGN PATENT DOCUMENTS

| | | |
|---|---|---|
| EP | 0934974 A1 | 11/1999 |
| JP | 57-170725 | 10/1982 |

(Continued)

OTHER PUBLICATIONS

United States Office Action dated May 16, 2012, in U.S. Appl. No. 12/659,114.

(Continued)

*Primary Examiner* — Jill Gray
(74) *Attorney, Agent, or Firm* — McGinn IP Law Group, PLLC (57) ABSTRACT

A hydrated water-absorption polymer containing resin composition includes a liquid cross-link curable resin composition, and a water-absorption polymer dispersed in the liquid cross-link curable resin composition. The water-absorption polymer is preliminarily hydrated and swollen. The water-absorption polymer before being hydrated and swollen includes an average particle diameter of not more than 10 μm. The water-absorption polymer includes an amount of water absorption of 10 to 100 g/g.

15 Claims, 7 Drawing Sheets

(56) References Cited

U.S. PATENT DOCUMENTS

| | | |
|---|---|---|
| 6,297,319 B1 * | 10/2001 | Nagasuna et al. ............ 525/96 |
| 6,304,699 B2 * | 10/2001 | Field et al. .................. 385/100 |
| 6,304,701 B1 * | 10/2001 | Bringuier et al. ............ 385/106 |
| 6,326,551 B1 * | 12/2001 | Adams ...................... 174/113 C |
| 6,577,796 B2 * | 6/2003 | Anelli et al. ................ 385/112 |
| 6,586,094 B1 * | 7/2003 | Rebouillat et al. ........... 428/372 |
| 6,596,782 B1 * | 7/2003 | Mogami et al. .............. 521/59 |
| 6,620,878 B1 * | 9/2003 | Lyons et al. ................. 524/515 |
| 7,026,373 B2 * | 4/2006 | Smith et al. ................. 522/182 |
| 7,462,754 B2 * | 12/2008 | Malowaniec et al. ......... 604/369 |
| 8,129,439 B2 | 3/2012 | Kato et al. |
| 2003/0012928 A1 * | 1/2003 | Malowaniec et al. ......... 428/147 |
| 2011/0079416 A1 | 4/2011 | Kato et al. |
| 2011/0180298 A1 | 7/2011 | Kato et al. |
| 2012/0090865 A1 | 4/2012 | Kato et al. |
| 2012/0090871 A1 | 4/2012 | Kato et al. |

FOREIGN PATENT DOCUMENTS

| | | |
|---|---|---|
| JP | 58-062024 | 4/1983 |
| JP | 59-84935 (A) | 5/1984 |
| JP | 02-067336 A | 3/1990 |
| JP | 2-69536 (A) | 3/1990 |
| JP | 3-185063 | 8/1991 |
| JP | 11-5863 | 1/1999 |
| JP | 11-100457 | 4/1999 |
| JP | 3717942 | 9/2005 |

OTHER PUBLICATIONS

Japanese Office Action dated Nov. 22, 2011 with an English translation.

Notification of Reason(s) for Refusal dated Dec. 10, 2013, with English translation.

* cited by examiner

- 7 COAXIAL CABLE
- 2 CONDUCTOR
- 4 VOID
- 8 SHIELDING WIRE
- 9 COVERING LAYER
- 3 INSULATION LAYER

3 INSULATION LAYER
4 VOID

3 INSULATION LAYER
4 VOID

3 INSULATION LAYER
4 VOID

3 INSULATION LAYER
4 VOID

FIG.13

HYDRATED WATER-ABSORPTION POLYMER CONTAINING RESIN COMPOSITION, POROUS BODY AND INSULATED WIRE USING SAME, METHOD OF MAKING THE WIRE AND COAXIAL CABLE

The present application is based on Japanese patent application No. 2008-050913 filed on Feb. 29, 2008, the entire contents of which are incorporated herein by reference.

BACKGROUND OF THE INVENTION

1. Field of the Invention

This invention relates to a hydrated water-absorption polymer containing resin composition, a porous body (or material) and an insulated wire using the same, a method of making the insulated wire and a coaxial cable.

2. Description of the Related Art

In recent years, according as precision electronic devices and communication devices as used in the medical field are downsized or high-density installed, wires and cables used therefor need to be reduced in diameter.

On the other hand, signal wires are required to provide a further high-speed transmitted signal. Therefore, insulation layer used for the signal wire is desired to be thinned and decreased in dielectric constant as much as possible in order to increase the speed of the transmitted signal.

It is known that insulation materials used therefor are obtained by foaming a low-dielectric constant insulation material such as polyethylene and fluorine resin. It is also known that the foamed insulation materials are formed by winding a pre-foamed film on a conductor or by extrusion. Above all, the extrusion is in wide use.

The foaming technology is generally classified into a physical foaming method and a chemical foaming method.

The physical foaming method is conducted such that a volatile foaming liquid such as liquefied chlorofluorocarbon is injected into a melted resin to make foams by the vaporization pressure, or a foaming gas such as nitrogen gas and carbon dioxide gas is directly injected into a melt resin in an extruder to generate uniformly-distributed cellular fine foams in the resin.

The chemical foaming method is generally conducted such that a resin is molded with a foaming agent dispersed in the resin, it is then heated to cause the decomposition reaction of the foaming agent, and foams are produced by using gas generated by the decomposition.

Related arts to the invention are as follows.
JP-A-S58-62024
JP-A-S57-170725
JP-A-H03-185063
JP-A-H11-5863
JP-A-H11-100457
JP-B-3717942

However, the method of injecting the volatile foaming liquid into the melted rein has the problem that, due to the high-pressure gas, it is difficult to make fine foams and to make a thin mold. Further, due to the low injection speed of the volatile foaming liquid, it is difficult to increase the production speed, where the productivity lowers. The method of directly injecting the foaming gas into the extruder has the problem that it is difficult to produce a small-diameter or thin mold, and it requires a special facility or technology for safety, where the productivity lowers and the production cost increases.

On the other hand, the chemical foaming method has the following problems. After the resin with the foaming agent dispersed therein is molded, it is heated to decompose the foaming agent to produce foams by using the decomposition gas. Therefore, the temperature during the resin molding needs to be lower than the decomposition temperature of the foaming agent. Further, in making the covering by extrusion, small-diameter wires used therefor may be broken by the pressure of the resin, so that it is difficult to increase the production speed.

In addition, the physical foaming method is not environmentally friendly since it uses chlorofluorocarbon, butane, carbon dioxide etc. The foaming agent used for the chemical foaming method is relatively costly.

SUMMARY OF THE INVENTION

It is an object of the invention to provide a hydrated water-absorption polymer containing resin composition that is environmentally friendly without using the physical foaming method, a porous body (or material) and an insulated wire using the same, a method of making the insulated wire and a coaxial cable.

(1) According to one embodiment of the invention, a hydrated water-absorption polymer containing resin composition comprises:

a liquid cross-link curable resin composition; and a water-absorption polymer dispersed in the liquid cross-link curable resin composition, the water-absorption polymer being preliminarily hydrated and swollen, wherein the water-absorption polymer before being hydrated and swollen comprises an average particle diameter of not more than 10 μm, and wherein the water-absorption polymer comprises an amount of water absorption of 10 to 100 g/g.

In the above embodiment (1), the following modifications, changes and a combination thereof can be made.

(i) The liquid cross-link curable resin composition comprises a ultraviolet or thermally curable resin composition.

(2) According to another embodiment of the invention, a porous body comprises:

the hydrated water-absorption polymer containing resin composition according to the embodiment (1), wherein the hydrated water-absorption polymer containing resin composition is cured by cross linking, and wherein the water-absorption polymer of the cured hydrated water-absorption polymer containing resin composition is dehydrated by heating.

(3) According to another embodiment of the invention, an insulation wire comprises:

a conductor; and an insulation layer on the conductor, wherein the insulation layer comprises the hydrated water-absorption polymer containing resin composition according to the embodiment (1), wherein the hydrated water-absorption polymer containing resin composition is cured by cross linking, and wherein the water-absorption polymer of the cured hydrated water-absorption polymer containing resin composition is dehydrated by heating.

In the above embodiment (3), the following modifications, changes and a combination thereof can be made.

(ii) The insulation layer comprises a thickness of not more than 100 μm and a porosity of 20 to 60%.

(iii) The insulation layer comprises a void formed substantially circular in cross section, wherein the void comprises a maximum diameter portion and a minimum diameter portion, a ratio of the maximum diameter portion and the minimum diameter portion being not more than 2, and wherein the void comprises a diameter D in a thickness direction, the diameter D meeting D<½t where t represents a thickness of the insulation layer.

(4) According to another embodiment of the invention, a coaxial cable comprises:
the insulation wire according to the embodiment (3); and
a metal layer on the insulation wire.

(5) According to another embodiment of the invention, a method of making an insulation wire comprises:
preparing a water-absorption polymer hydrated and swollen;
preparing a hydrated water-absorption polymer containing resin composition by dispersing the water-absorption polymer in a liquid cross-link curable resin composition;
coating the hydrated water-absorption polymer containing resin composition on a surface of a conductor to form an insulation layer thereon;
curing the hydrated water-absorption polymer containing resin composition by cross linking; and
heating the hydrated water-absorption polymer containing resin composition to dehydrate the water-absorption polymer to form a void in the insulation layer.

In the above embodiment (5), the following modifications, changes and a combination thereof can be made.

(iv) The hydrated water-absorption polymer containing resin composition is heated by a microwave heating.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

The preferred embodiments of the invention will be described below with reference to the attached drawings.

A hydrated water-absorption polymer containing resin composition of the embodiment is formed by dispersing a water-absorption polymer, which is preliminarily swollen by supply of water, in a liquid cross-link curable resin composition. The average particle diameter of the water-absorption polymer before water swelling is not more than 10 μm, preferably 0.5 to 5 μm, more preferably about 1 μm.

The reason for setting the average particle diameter before water swelling to be not more than 10 μm is as follows. If the average particle diameter of the water-absorption polymer before water swelling is more than 10 μm, it is difficult to disperse the watered water-absorption polymer in the liquid cross-link curable resin composition, to make a 100 μm or less thin film and to make a microscopic porous film since the polymer increases several to several tens of times in volume by being watered. The swelling magnification of the water-absorption polymer is preferably not more than 5 times the particle diameter, and the particle diameter of the water absorbing and swollen hydrated water-absorption polymer is preferably 1 to 50 μm. The amount of water absorption in the water-absorption polymer is preferably 10 to 100 g/g, more preferably 20 to 60 g/g.

Here, the amount of water absorption in the water-absorption polymer is defined as the amount of absorbed water relative to 1 g of water-absorption polymer. The reason for setting the amount of water absorption to be 10 to 100 g/g is as follows. If the amount of water absorption is less than 10 g/g, the amount of added water-absorption polymer needs to be increased so as to have a high porosity (or void ratio) so that problems may arise in aspects of production cost and mechanical property or the void formation efficiency lowers. If the amount of water absorption is more than 100 g/g, the dehydration efficiency lowers or the microscopic void is difficult to form.

The liquid cross-link curable resin composition is a composition curable by ultraviolet rays, heat, electronic beams, visible light etc. and is not specifically limited. It is preferably a resin composition cross-link curable by ultraviolet rays, heat or a combination thereof, more preferably a UV cross-link curable resin composition. The liquid cross-link curable resin composition can be the known liquid cross-link curable resin compositions such as ethylene-system, urethane-system, silicone-system, fluorine-system, epoxy-system, polyester-system, polycarbonate-system. The liquid cross-link curable resin composition has a dielectric constant of preferably not more than 4, more preferably not more than 3.

The water-absorption polymer is a polymer material that can absorb water very well and does not discharge absorbed water due to its high water-holding ability even when some pressure is applied. For example, it can be a hydrolysate of starch-acrylonitrile graft polymer, starch-acrylic acid graft polymer, a hydrolysate of vinyl acetate-acrylic acid ester copolymer, polyacylate cross-linked compound, carboxymethylated cellulose, polyalkylene oxide system resin, polyacrylamide system resin etc. The polyalkylene oxide system resin and polyacrylamide system resin are preferable in aspect of electrical insulation property. However, the preferable water-absorption polymer is not limited thereto depending on the use or the used amount, and may be a combination of the two or more above polymers.

In supplying water to the water-absorption polymer, it is preferred to add water at the amount of water absorption or more of the water-absorption polymer. If water is added less than the amount of water absorption, the amount of water absorption may be not uniform among the particles of the water-absorption polymer.

The other way of supplying water to the water-absorption polymer may be conducted by using a solvent which is soluble in water and insoluble in the water-absorption polymer such that water less than the amount of water absorption of the water-absorption polymer can be uniformly absorbed thereby.

The added amount of the water-absorption polymer is preferably 0.1 to 10 parts by weight, more preferably 0.5 to 5 parts by weight, most preferably 0.5 to 3 parts by weight. The reason why the added amount of the water-absorption polymer is preferably 0.1 to 10 parts by weight is as follows. If the added amount of the water-absorption polymer is more than 10 parts by weight, it is difficult to form the film and to have the mechanical property when the polymer with water absorbed therein is dispersed. If the added amount of the water-absorption polymer is less than 0.1 parts by weight, the voids may be insufficiently formed. When the water-absorption polymer is added, the amount of water absorption in the liquid cross-link curable resin composition is adjusted to preferably 25 to 65%.

The reason for dispersing the water absorbing and swollen water-absorption polymer is as follows. The size and shape of the voids can be controlled by the particle diameter of the water-absorption polymer and the amount of water absorption. The water-absorption polymer which is gelled by the water absorbing and swelling contains much water, and the liquid cross-link curable resin composition is not compatible with water. Therefore, when being agitated and dispersed, the water-absorption polymer is easily independently dispersed or easily dispersed to form a sphere. Thus, the void shape obtained by dehydration after curing can be substantially spherical so that the cured resin can be resistant to external collapsing pressure.

The hydrated water-absorption polymer containing resin composition may include, according to need, a dispersing agent, a leveling agent, a coupling agent, a coloring agent, a flame retardant, an antioxidant, an electrical insulation improver, a filler etc. which are conventionally known.

The water-absorption polymer can be used such that the size or shape of the void is adjusted by the particle diameter and the amount of water absorption of the water-absorption polymer, and such that the covering (or jacket) is formed while preliminarily forming portions to be the void in the liquid cross-link curable resin composition. Thus, the size or shape of the void can be easily controlled by using the water-absorption polymer.

According to the hydrated water-absorption polymer containing resin composition of the embodiment, the size or shape of the void can be adjusted by the particle diameter and the amount of water absorption of the water-absorption polymer. Thus, where the water-absorption polymer containing resin composition is used as a material for the insulation layer of a thin and small-diameter porous body covered wire, the insulation wire can be easily made without breaking the wire.

The porous body can be formed such that, after curing the hydrated water-absorption polymer containing resin composition by cross linking, the cured hydrated water-absorption polymer containing resin composition is heated to remove the moisture of the water-absorption polymer.

An insulation wire using the hydrated water-absorption polymer containing resin composition thus formed will be described below.

Figure 1:
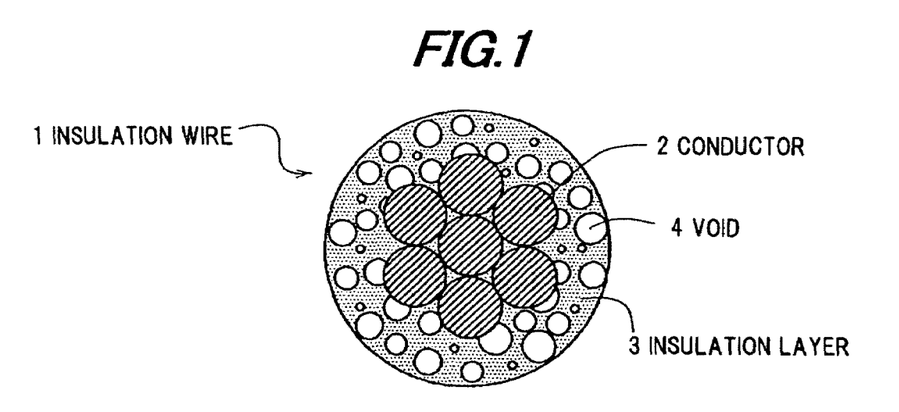
FIG. 1 is a cross sectional view showing an insulation wire in a preferred embodiment according to the invention.

As shown in FIG. 1, the insulation wire 1 is composed of a conductor 2, and an insulation layer 3 that is formed by coating the surface of the conductor 2 with the hydrated water-absorption polymer containing resin composition, curing the hydrated water-absorption polymer containing resin composition, and heating the cured hydrated water-absorption polymer containing resin composition to remove the moisture of the water-absorption polymer.

The insulation layer 3 is 100 μm or less in thickness, and 20% to 60% in porosity. A void 4 forming the porosity of the insulation layer 3 is substantially circular in cross section and 2 or less in the ratio of a maximum-diameter portion and a minimum-diameter portion thereof. A void diameter D in the thickness direction is formed $D < \frac{1}{2}t$ where the thickness of the insulation layer 3 is 't'.

The reason for setting 100 μm or less in the thickness of the insulation layer 3 is that the insulation layer of a coaxial cable such as a medical probe cable is required to be thinned and reduced in dielectric constant according as the coaxial cable is improved to be reduced in diameter and to provide a further high-speed transmitted signal.

Although the formation of voids is effective for reducing the dielectric constant of the insulation layer, too-high porosity or too-large void diameter causes a problem that the insulation layer may be crushed to fail in a stable signal transmission. When the void 4 forming the porosity of the insulation layer is substantially circular in cross section and 2 or less in the ratio of the maximum-diameter portion and the minimum-diameter portion thereof, and the void diameter D in the thickness direction is formed $D < \frac{1}{2}t$, the insulation wire 1 can be excellent in crush resistance as well as being thinned and reduced in dielectric constant.

The reason for setting the porosity of the insulation layer 3 to be 20% to 60% is as follows. If the porosity is less than 20%, the dielectric constant reducing effect may be insufficient. If the porosity is more than 60%, the formability and crush resistance of the insulation layer may be reduced.

The reason for setting the ratio of the maximum-diameter portion and the minimum-diameter portion of the void 4 to be 2 or less is that, if the ratio is more than 2, the crush may be more caused. The reason for setting the void diameter D in the thickness direction to be $D < \frac{1}{2}t$ to the thickness t of the insulation layer 3 is that, if more than $\frac{1}{2}t$, the crush may be more caused by the increased porosity.

A method of making the insulation wire 1 of the embodiment will be described below.

The hydrated water-absorption polymer containing resin composition, in which the water-absorption polymer preliminarily swollen by supply of water is dispersed in the liquid cross-link curable resin composition, is coated on the surface of the conductor 2 to form the insulation layer 3. Then, the insulation layer 3 is heated to cure the hydrated water-absorption polymer containing resin composition. Then, it is heated by microwave to remove the moisture of the water-absorption polymer to form the voids 4 in the insulation layer 3. Thereby, the insulation wire 1 of the embodiment can be obtained.

The reason for conducting the dehydration by heating after the hydrated water-absorption polymer containing resin composition coated thereon is cured is that the reduction in porosity can be prevented by the volume contraction by the dehydration and the change in film thickness or outer diameter can be prevented to stabilize it. Further, since the insulation layer 3 can be formed preliminarily including the portions to be the void 4, it is not necessary to foam it. Thus, no reduction in adhesiveness is caused by swelling or separation between the conductor 2 and the foamed layer (or insulation layer) which may occur in the conventional gas foaming process by gas injection or foaming agent.

Figure 13:
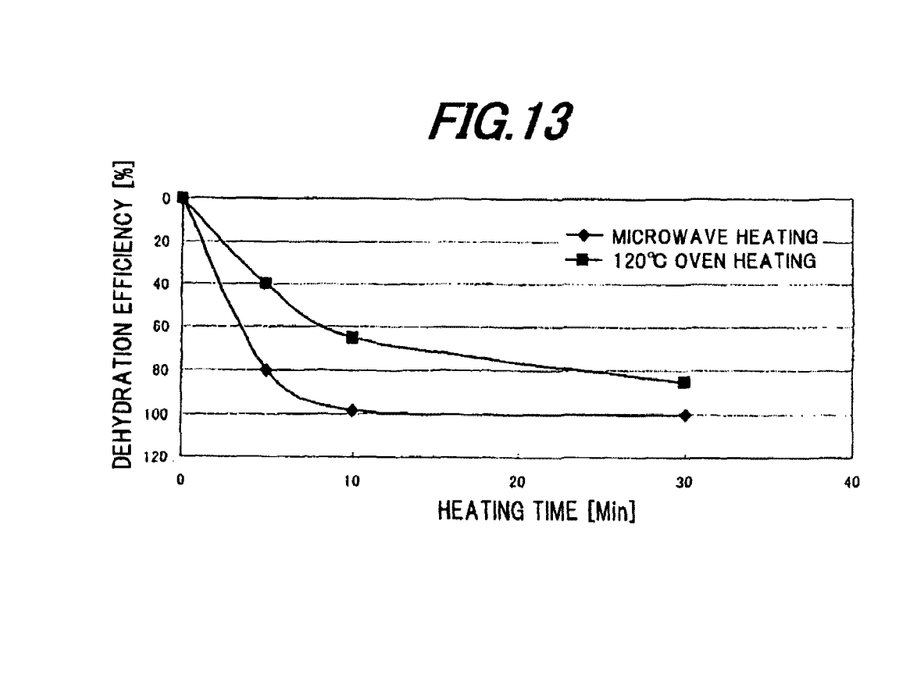
FIG. 13 is a graph exhibiting a comparison in dehydration efficiency between microwave heating and oven heating at 120° C.

The reason for using the microwave heating in removing the moisture of the water-absorption polymer is that water is rapidly heated by microwave without affecting the amount of water absorption or the peripheral polymer such that, as shown in FIG. 13, the dehydration by microwave can be completed for short time as compared to dehydration by 120° C. oven heating so as to efficiently form the voids. In case of using a waveguide type microwave heater, the heating and dehydration can be continuously conducted.

According to the insulation wire 1 and the method of making the same, the porous body or porous body covered wires can be easy obtained by being hydrated by heating after curing the hydrated water-absorption polymer containing resin composition. Further, since the particle diameter and the amount of water absorption of the water-absorption polymer is properly adjusted in the liquid cross-link curable resin composition, the thin and small-diameter porous body covered wire can be easily made without breaking the wire.

Figure 2:
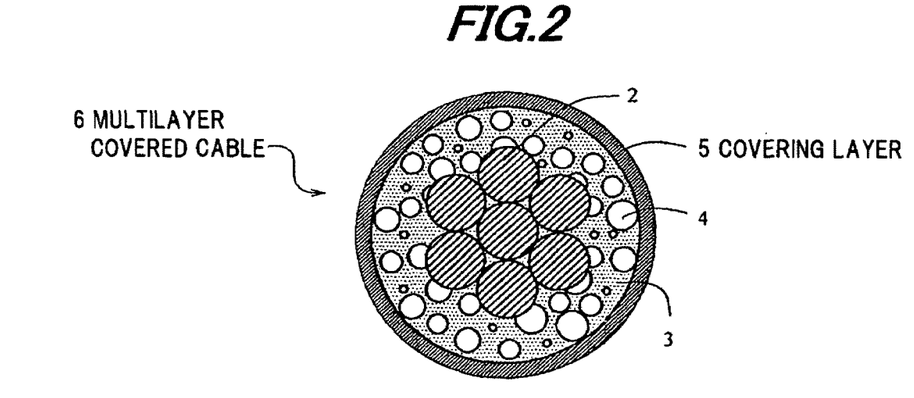
FIG. 2 is a cross sectional view showing a multilayer covered cable using the insulation wire in FIG. 1.

As shown in FIG. 2, a multilayer covered cable 6 can be produced by using the insulation wire 1 and forming a skin layer or covering layer 5 on the surface of the insulation wire in FIG. 1.

Figure 3:
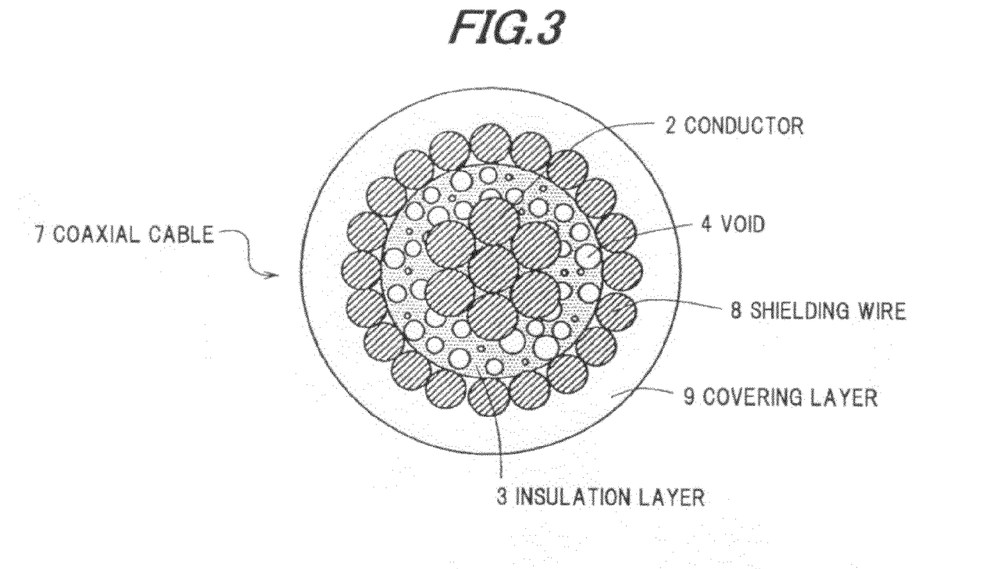
FIG. 3 is a cross sectional view showing a coaxial cable using the insulation wire in FIG. 1.

Alternatively, as shown in FIG. 3, a coaxial cable 7 can be produced by covering the insulation wire 1 in FIG. 1 with metallic shielding wires 8 and further forming a covering layer 9 thereon. The shielding wires 8 may be replaced by a shielding layer.

The porous body (or foamed material) from the hydrated water-absorption polymer containing resin composition can be also used for a buffer material, a shock-absorbing film (or sheet), a light reflection plate etc.

Also, the liquid cross-link curable resin composition can be used to form a porous layer on the surface of a deformed body because of its fluidity.

EXAMPLES

TABLE 1

| | Resin composition (parts by weight) | | |
|---|---|---|---|
| | A | B | C |
| Polybutadiene acrylate oligomer *1 | 100 | | |
| Urethane acrylate oligomer *2 | | 100 | |
| Styrene end-modified oligo-phenylene ether *3 | | | 100 |
| Dicyclopentanyl methacrylate *4 | 50 | 50 | 30 |
| Isobonyl acrylate *5 | 30 | 30 | 30 |
| N-vinylpyrrolidone *6 | | | 20 |
| 2,4,6-trimethyl benzoyldiphenyl phophinoxide *7 | 5 | 5 | 5 |
| 1-hydroxy cyclohexyl phenylketone *8 | 1 | 1 | 1 |
| Dielectric constant of cured resin (by cavity resonance method @10 GHz) | 2.4 | 2.6 | 2.5 |

*1 TEAI-1000 from Nippon Soda Co., Ltd.
*2 M-1100 from Toa Gosei Kagaku Kogyo K.K.
*3 OPE-2St from Mitsubishi Gas Chemical Company, Inc.
*4 FA-513M from Hitachi Chemical Co., Ltd.
*5 IB-XA from KYOEISHA CHEMICAL Co., LTD
*6 M-150 from Toa Gosei Kagaku Kogyo K.K.
*7 DAROCUR TPO from Ciba Specialty Chemicals K.K.
*8 IRGACURE 184 from Ciba Specialty Chemicals K.K.

As the liquid cross-link curable resin composition, three resin compositions (A to C) as shown in Table are used. The resin compositions are each formed into an about 200 μm thick film by using a 15 MIL blade and curing at a UV irradiation level of 500 mJ/cm$^2$ in nitrogen atmosphere. Their dielectric constant measurements obtained by cavity resonance method (@10 GHz) are 2.4, 2.6 and 2.5, respectively.

Referring to Tables 2 and 3, Examples 1 to 7 and Comparative Examples 1 to 8 will be described below. The average particle diameter is measured by using a particle size distribution measurement device (from Microtrac Inc., MT3000II) where volume average D50 is used.

TABLE 2

| | | | | Example | | | | | |
|---|---|---|---|---|---|---|---|---|---|
| Item | | | 1 | 2 | 3 | 4 | 5 | 6 | 7 |
| Base resin composition | Polybutadiene acrylate oligomer | | 100 | 100 | 100 | 100 | | | |
| | Urethane acrylate oligomer | | | | | | 100 | 100 | |
| | Styrene end-modified oligo-phenylene ether | | | | | | | | 100 |
| | Dicyclopentanyl methacrylate | | 50 | 50 | 50 | 50 | 50 | 50 | 30 |
| | Isobonyl acrylate | | 30 | 30 | 30 | 30 | 30 | 30 | 30 |
| | N-vinylpyrrolidone | | | | | | | | 20 |
| | 2,4,6-trimethyl benzoyldiphenyl phophinoxide | | 5 | 5 | 5 | 5 | 5 | 5 | 5 |
| | 1-hydroxy cyclohexyl phenylketone | | 1 | 1 | 1 | 1 | 1 | 1 | 1 |
| Water-absorption polymer dispersed resin composition | Base resin composition | | 100 | 100 | 100 | 100 | 100 | 100 | 100 |
| | polyalkylene oxide system resin TWB-PF | 5 μm | | 10 | | | | | |
| | | 8 μm | | | 2.5 | | | | |
| | | 10 μm | 2 | | | | | | |
| | | 15 μm | | | | | | | |
| | Polyacrylate cross-linked | 1 μm | | | | | | 2.5 | |
| | | 3 μm | | | | 2 | | | 1 |

TABLE 2-continued

| Item | | | Example 1 | Example 2 | Example 3 | Example 4 | Example 5 | Example 6 | Example 7 |
|---|---|---|---|---|---|---|---|---|---|
| polymer I 10SH-NF | | 25 μm | | | | | | | |
| Polyacrylate cross-linked polymer I ST-500MPSA | | 5 μm | | | | | | 1 | |
| | | 10 μm | | | | | | | |
| Water | | | 62 | 100 | 37.5 | 60 | 147.5 | 90 | 59 |
| Sum total | | | 164 | 210 | 140 | 162 | 250 | 191 | 160 |
| Amount of water absorption (g/g) for adjusting water-absorption polymer | | | 31 | 10 | 15 | 30 | 59 | 90 | 59 |
| Moisture content (%) | | | 37.8 | 47.6 | 26.8 | 37.0 | 59.0 | 47.1 | 36.9 |
| Film | Formability | 50 μm | good | good | good | good | good | good | good |
| | | 100 μm | good | good | good | good | good | good | good |
| | | 200 μm | good | good | good | good | good | good | good |
| | Porosity (%) after heat-dehydration | 50 μm | 36.5 | 46 | 25.5 | 36.5 | 57 | 46 | 36 |
| | Dielectric constant @10 GHz by cavity resonance method | 50 μm | 1.8 | 1.7 | 2.05 | 1.8 | 1.67 | 1.78 | 1.85 |
| | 50 μm | a/b | 1 to 1.4 | 1 to 1.7 | 1 to 1.2 | 1 to 1.4 | 1 to 1.2 | 1 to 1.5 | 1 to 1.3 |
| | | D < ½ t | meet | meet | meet | meet | meet | meet | meet |
| | 100 μm | a/b | 1 to 1.5 | 1 to 1.5 | 1 to 1.2 | 1 to 1.4 | 1 to 1.2 | 1 to 1.4 | 1 to 1.3 |
| | | D < ½ t | meet | meet | meet | meet | meet | meet | meet |
| | 200 μm | a/b | 1 to 1.3 | 1 to 1.5 | 1 to 1.2 | 1 to 1.3 | 1 to 1.2 | 1 to 1.2 | 1 to 1.3 |
| | | D < ½ t | meet | meet | meet | meet | meet | meet | meet |
| Wire | Formability | 50 μm | good | good | good | good | good | good | good |
| | Porosity (%) | | 35.5 | 46 | 25 | 36 | 57 | 45 | 35.3 |
| | Covering layer | a/b | 1 to 1.5 | 1 to 1.8 | 1 to 1.3 | 1 to 1.4 | 1 to 1.3 | 1 to 1.6 | 1 to 1.4 |
| | | D < ½ t | meet | meet | meet | meet | meet | meet | meet |

Example 1

In 100 parts by weight of the resin composition A, 2 parts by weight of a water-absorption polymer of polyalkylene oxide system resin (AQUACALK TWB-PF, 50 μm in average particle diameter, 31 g/g in amount of water absorption, Sumitomo Seika Chemicals Co., Ltd.) which is powdered into average particle diameter of 10 μm and contains 62 parts by weight of distilled water as a saturation amount of water absorption is agitated and dispersed. Thereby, a resin composition of Example 1 is obtained which is formed of a hydrated water-absorption polymer containing resin composition with moisture content of 37.8%.

The resin composition of Example 1 is coated 100 mm in width and 200 mm in length on a glass plate by using 4 MIL, 7 MIL and 15 MIL blades. They are cured by UV-irradiation of 500 mJ/cm² on a UV irradiation conveyer to produce films of about 50, 100 and 200 μm, respectively, in thickness. Here, it is confirmed that they are good in film formability.

Figure 4:
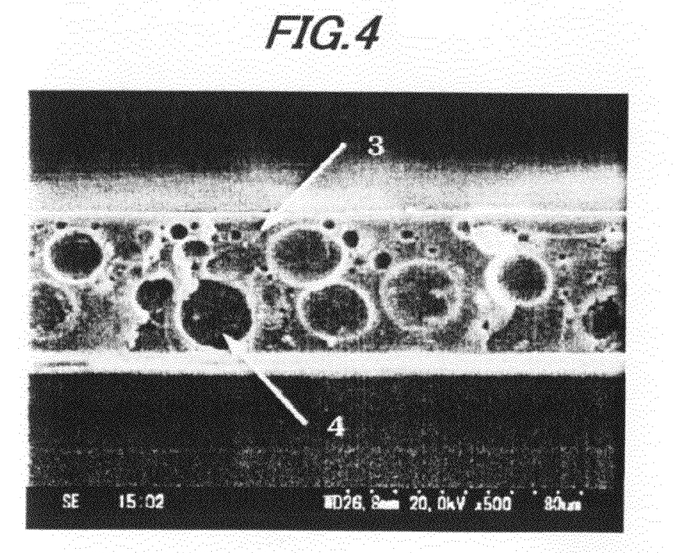
FIG. 4 is a photograph showing a cross section of a 50 μm thick film in Example 1 of the invention.

The films are heated for 5 min. by a microwave heater (with oscillation frequency of 2.45 GHz). Then, by observing the cross section by an electron microscope, it is confirmed that a lot of voids are formed (See FIG. 4 which shows a 50 μm thick film section example).

As shown in Table 2, the 50 μm thick film has a porosity of about 36.5% which is obtained from a film volume and a weight after dehydration by heating. It has a dielectric constant of 1.8 (@10 GHz) which is measured by cavity resonance method. In the 50, 100 and 200 μm thick films, the maximum diameter portion a and the minimum diameter portion b in void section are measured and all meet a/b≤2, with respect to 101 or more voids observed in 5 film section photographs taken by the electron microscope. Further, it is confirmed that void diameters D in the thickness direction are all less than ½t with respect to the film thickness t.

Then, the resin composition of Example 1 is coated on a stranded conductor 48 AWG (7/0.013 S-MF-AG alloy wire, Hitachi Cable, Ltd.) at a speed of 50/min in a pressure coating bath. Then, it is cured by passing through two UV irradiators (from EYE GRAPHICS Co., Ltd., 6 kW), and then heat-hydrated passing through the waveguide type microwave heater. Thus, a 50 μm thick covering wire is obtained, and it is confirmed that a lot of voids are formed in the insulation layer by observing the cross section. The insulation layer has a porosity of about 35.5%, which is calculated from the volume and weight thereof per meter. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Example 2

In 100 parts by weight of the resin composition A, 10 parts by weight of a water-absorption polymer of the polyalkylene oxide system resin which is powdered into average particle diameter of 5 μm and contains 100 parts by weight of distilled water as adjusted 10 g/g in the amount of water absorption is agitated and dispersed. Thereby, a resin composition of Example 2 is obtained which is formed of a hydrated water-absorption polymer containing resin composition with moisture content of 47.6%.

Figure 5:
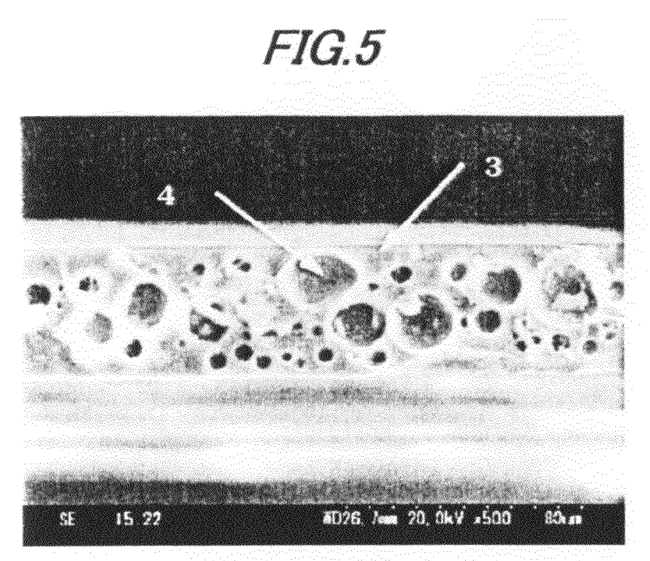
FIG. 5 is a photograph showing a cross section of a 50 μm thick film in Example 2 of the invention.

The resin composition of Example 2 is formed into films as in Example 1, where it is confirmed that they are good in film formability (See FIG. 5 which shows a 50 μm thick film section example). After heating by microwave, the 50 μm thick film has a porosity of about 46% and a dielectric constant of 1.7. In the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that a lot of voids are formed in the insulation layer by observing the cross section. The insulation layer has a porosity of about 45%. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Example 3

In 100 parts by weight of the resin composition A, 2.5 parts by weight of a water-absorption polymer of the polyalkylene oxide system resin which is powdered into average particle diameter of 8 μm and contains 37.5 parts by weight of distilled water as adjusted 15 g/g in the amount of water absorption is agitated and dispersed. Thereby, a resin composition of Example 3 is obtained which is formed of a hydrated water-absorption polymer containing resin composition with moisture content of 26.8%.

Figure 6:
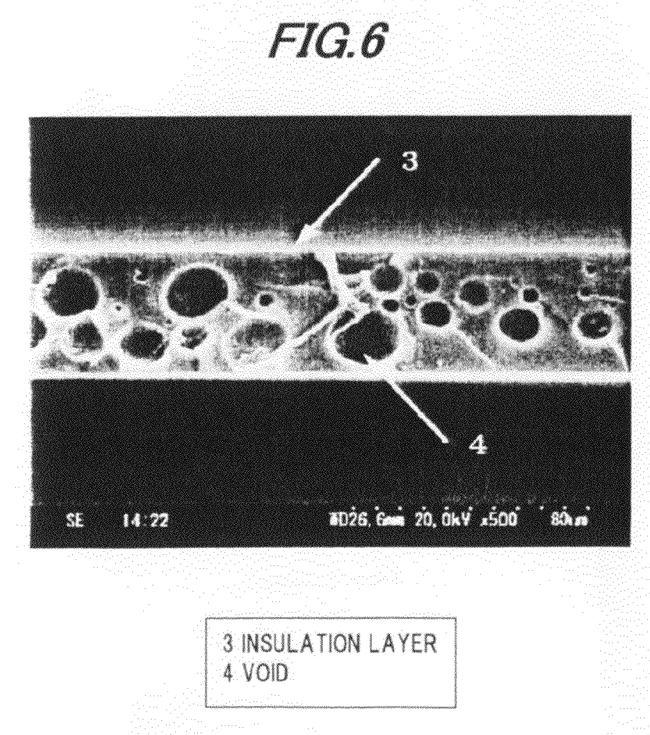
FIG. 6 is a photograph showing a cross section of a 50 μm thick film in Example 3 of the invention.

The resin composition of Example 3 is formed into films as in Example 1, where it is confirmed that they are good in film formability (See FIG. 6 which shows a 50 μm thick film section example). After heating by microwave, the 50 μm thick film has a porosity of about 25.5% and a dielectric constant of 2.05. In the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that a lot of voids are formed in the insulation layer by observing the cross section. The insulation layer has a porosity of about 25%. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Example 4

In 100 parts by weight of the resin composition A, 2.5 parts by weight of a water-absorption polymer of polyacrylate cross-linked polymer I (AQUA KEEP 10SH-NF, 25 μm in average particle diameter, 59 g/g in amount of water absorption, Sumitomo Seika Chemicals Co., Ltd.) which is powdered into average particle diameter of 3 μm and contains 60 parts by weight of distilled water as adjusted 30 g/g in the amount of water absorption is agitated and dispersed. Thereby, a resin composition of Example 4 is obtained which is formed of a hydrated water-absorption polymer containing resin composition with moisture content of 37%.

The resin composition of Example 4 is formed into films as in Example 1, where it is confirmed that they are good in film formability. After heating by microwave, the 50 μm thick film has a porosity of about 36.5% and a dielectric constant of 1.8. In the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that a lot of voids are formed in the insulation layer by observing the cross section. The insulation layer has a porosity of about 36%. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Example 5

In 100 parts by weight of resin composition B, 2.5 parts by weight of a water-absorption polymer of the polyacrylate cross-linked polymer I which is powdered into average particle diameter of 1 μm and contains 147.5 parts by weight of distilled water as a saturation amount of water absorption is agitated and dispersed. Thereby, a resin composition of Example 5 is obtained which is formed of a hydrated water-absorption polymer containing resin composition with moisture content of 59%.

Figure 7:
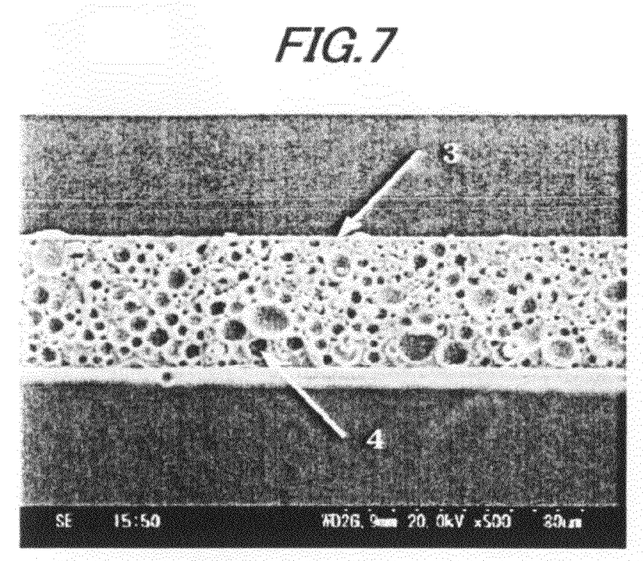
FIG. 7 is a photograph showing a cross section of a 50 μm thick film in Example 5 of the invention.

The resin composition of Example 5 is formed into films as in Example 1, where it is confirmed that they are good in film formability (See FIG. 7 which shows a 50 μm thick film section example). After heating by microwave, the 50 μm thick film has a porosity of about 57% and a dielectric constant of 1.67. In the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that a lot of voids are formed in the insulation layer by observing the cross section. The insulation layer has a porosity of about 56%. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Example 6

In 100 parts by weight of the resin composition B, 1 part by weight of a water-absorption polymer of polyacrylate cross-linked polymer II (SUN FRESH ST-500MPSA, 730 g/g in amount of water absorption, San-Dia Polymers, Ltd.) which is powdered into average particle diameter of 5 μm and contains 100 parts by weight of distilled water as adjusted 100 g/g in the amount of water absorption is agitated and dispersed. Thereby, a resin composition of Example 6 is obtained which is formed of a hydrated water-absorption polymer containing resin composition with moisture content of 49.8%.

The resin composition of Example 6 is formed into films as in Example 1, where it is confirmed that they are good in film formability. After heating by microwave, the 50 μm thick film has a porosity of about 48.8% and a dielectric constant of 1.75. In the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that a lot of voids are formed in the insulation layer by observing the cross section. The insulation layer has a porosity of about 48%. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Example 7

In 100 parts by weight of resin composition C, 1 part by weight of a water-absorption polymer of the polyacrylate cross-linked polymer I which is powdered into average particle diameter of 3 μm and contains 59 parts by weight of distilled water as a saturation amount of water absorption is agitated and dispersed. Thereby, a resin composition of Example 7 is obtained which is formed of a hydrated water-absorption polymer containing resin composition with moisture content of 36.9%.

The resin composition of Example 7 is formed into films as in Example 1, where it is confirmed that they are good in film formability. After heating by microwave, the 50 μm thick film has a porosity of about 36% and a dielectric constant of 1.85. In the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that a lot of voids are formed in the insulation layer by observing the cross section. The insulation layer has a porosity of about 35.3%. As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

TABLE 3

| | Item | | Comparative Example 1 | 2 | 3 | 4 | 5 | 6 | 7 | 8 |
|---|---|---|---|---|---|---|---|---|---|---|
| Base resin composition | Polybutadiene acrylate oligomer | | 100 | 100 | 100 | | | | | PFA |
| | Urethane acrylate oligomer | | | | | 100 | 100 | 100 | 100 | |
| | Styrene end-modified oligo-phenylene ether | | | | | | | | | |
| | Dicyclopentanyl methacrylate | | 50 | 50 | 50 | 50 | 50 | 50 | 50 | |
| | Isobonyl acrylate | | 30 | 30 | 30 | 30 | 30 | 30 | 30 | |
| | N-vinylpyrrolidone | | | | | | | | | |
| | 2,4,6-trimethyl benzoyldiphenyl phophinoxide | | 5 | 5 | 5 | 5 | 5 | 5 | 5 | |
| | 1-hydroxy cyclohexyl phenylketone | | 1 | 1 | 1 | 1 | 1 | 1 | 1 | |
| Water-absorption polymer dispersed resin composition | Base resin composition | | 100 | 100 | 100 | 100 | 100 | 100 | 100 | 100 |
| | polyalkylene oxide system resin | 5 μm | | | | | | | | |
| | | 8 μm | | 20 | | | | | | |
| | TWB-PF | 10 μm | | | | 2 | | | | |
| | | 15 μm | 2 | | | | | | | |
| | Polyacrylate cross-linked polymer I 10SH-NF | 1 μm | | | | | | | | |
| | | 3 μm | | | | | | | 5 | |
| | | 25 μm | | | | | | 1 | | |
| | Polyacrylate cross-linked polymer II ST-500MPSA | 5 μm | | | 2 | | | | | |
| | | 10 μm | | | | | 1 | | | |
| | Water | | 62 | 100 | 220 | 18 | 110 | 59 | 295 | |
| Sum total | | | 164 | 220 | 322 | 120 | 211 | 160 | 400 | |
| Amount of water absorption (g/g) for adjusting water-absorption polymer | | | 31 | 5 | 110 | 9 | 110 | 59 | 59 | |
| Moisture content (%) | | | 37.8 | 45.5 | 68.3 | 15.0 | 52.1 | 36.9 | 73.8 | |
| Film | Formability | 50 μm | ○ | X (B) | X (U) | ○ | Δ (W) | ○ | X (U) | — |
| | | 100 μm | ○ | X (B) | X (U) | ○ | Δ (W) | ○ | X (U) | — |
| | | 200 μm | ○ | X (U) | X (U) | ○ | Δ (W) | ○ | X (U) | — |
| | Porosity (%) after heat-dehydration | 50 μm | 8 | — | — | 14 | — | 3 | — | — |
| | Dielectric constant @10 GHz by cavity resonance method | 50 μm | 2.35 | — | — | 2.3 | — | 2.65 | — | (2.02) *1 |
| | | 50 μm a/b | 1 to 1.2 | — | — | 1 to 1.4 | — | 1 to 1.2 | — | — |
| | | D < ½ t | ○ | — | — | ○ | — | ○ | — | — |
| | | 100 μm a/b | 1 to 1.3 | — | — | 1 to 1.3 | — | 1 to 1.8 | — | — |
| | | D < ½ t | X | — | — | ○ | — | X | — | — |
| | | 200 μm a/b | 1 to 1.3 | — | — | 1 to 1.3 | — | 1 to 1.8 | — | — |
| | | D < ½ t | X | — | — | ○ | — | X | — | — |
| Wire | Formability | 50 μm | X (BR) | X | X | ○ | X | X (BR) | X | X (BR) |
| | Porosity (%) | | — | — | — | 13 | — | — | — | — |

TABLE 3-continued

|  | | Comparative Example | | | | | | | |
|---|---|---|---|---|---|---|---|---|---|
| Item | | 1 | 2 | 3 | 4 | 5 | 6 | 7 | 8 |
| Covering layer | a/b | — | — | — | 1 to 1.5 | — | — | — | — |
|  | D < ½ t | — | — | — | ○ | — | — | — | — |

Notes:
*1: In-parenthesis data is taken at 1 mm thickness
○: In formability, good and in D < ½ t, meet this condition.
X: In formability, no good and in D < ½ t, not meet this condition.
Δ: In formability, not so good.
B: Brittle
U: Uncured
W: Weak
BR: Broken Comparative Example 1

In 100 parts by weight of the resin composition A, 2 parts by weight of a water-absorption polymer of the polyalkylene oxide system resin which is powdered into average particle diameter of 15 μm and contains 62 parts by weight of distilled water as a saturation amount of water absorption is agitated and dispersed. Thereby, a resin composition of Comparative Example 1 is obtained which is formed of a hydrated water-absorption polymer containing resin composition with moisture content of 37.8%.

Figure 8:
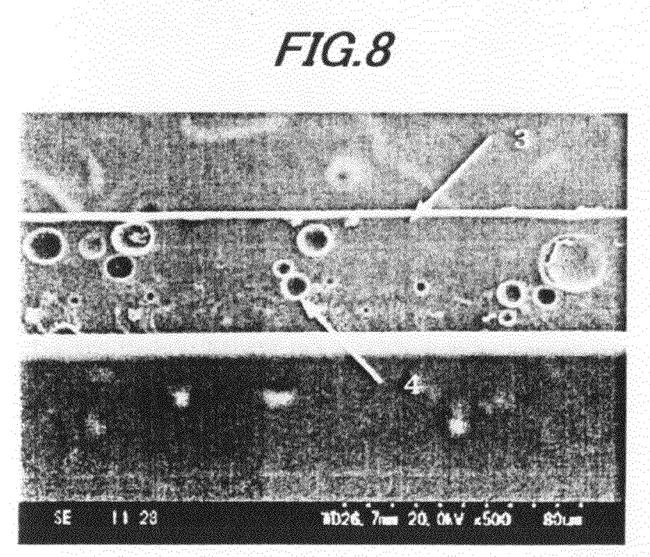
FIG. 8 is a photograph showing a cross section of a 50 μm thick film in Comparative Example 1.
Figure 9:
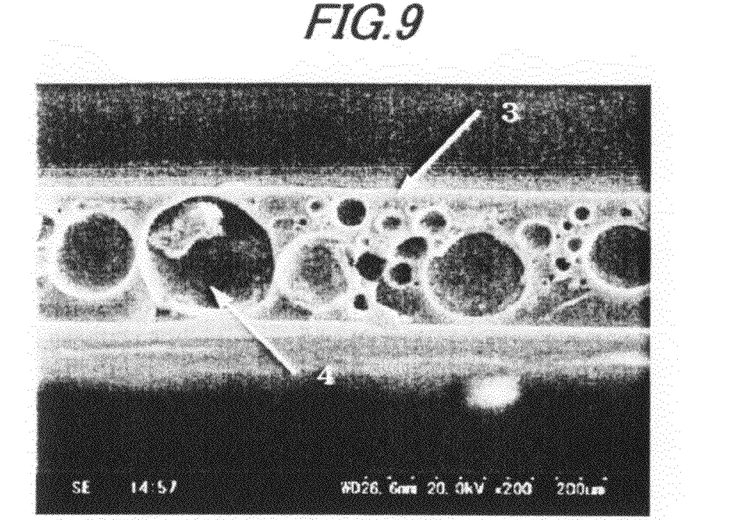
FIG. 9 is a photograph showing a cross section of a 100 μm thick film in Comparative Example 1.

The resin composition of Comparative Example 1 is formed into films as in Example 1. However, the 50 μm thick film has only a porosity of 8% and a dielectric constant of 2.35, where only few voids are formed in the insulation layer (See FIG. 8 which shows a 50 μm thick film section example). This is because the water-absorption polymer is increased to 3 to 4 times in average particle diameter by absorption and swelling, so that it is difficult to pass through a gap (100 μm) of the 4 MIL blade. According as the gap increases in changing to 7 MIL and 15 MIL blades, the number of voids in the film increases. However, it is found that, as shown in FIG. 9, the 100 μm thick film includes voids with a size close to the film thickness. This proves that the large water-absorption polymer with water absorbed therein cannot pass through the 4 MIL blade. In the 50, 100 and 200 μm thick films, the maximum diameter portion a and the minimum diameter portion b in void section are measured and all meet a/b≤2. However, it is confirmed that the 100 and 200 μm thick films have many void diameters D in the thickness direction more than ½t with respect to the film thickness t.

Then, as in Example 1, the production of covering wire is tried, but the covering as the insulation layer is difficult to form well and clogging or breaking of wire is likely to occur at a dice portion in the pressure coating bath. Thus, the covered wire cannot be completed.

Comparative Example 2

In 100 parts by weight of the resin composition A, 20 parts by weight of a water-absorption polymer of the polyalkylene oxide system resin which is powdered into average particle diameter of 8 μm and contains 100 parts by weight of distilled water as adjusted 5 g/g in the amount of water absorption is agitated and dispersed. Thereby, a resin composition of Comparative Example 2 is obtained which is formed of a hydrated water-absorption polymer containing resin composition with moisture content of 45.5%.

The resin composition of Comparative Example 2 is tried to be formed into a film as in Example 1. However, due to the large amount of the added water-absorption polymer, it is brittle such that it fails to be formed into the film. Then, as in Example 1, the production of covering wire is tried, but the covering as the insulation layer is difficult to form well. Thus, the covered wire cannot be completed.

Comparative Example 3

In 100 parts by weight of the resin composition A, 2 parts by weight of a water-absorption polymer of the polyacrylate cross-linked polymer II which is powdered into average particle diameter of 5 μm and contains 220 parts by weight of distilled water as adjusted 110 g/g in the amount of water absorption is agitated and dispersed. Thereby, a resin composition of Comparative Example 3 is obtained which is formed of a hydrated water-absorption polymer containing resin composition with moisture content of 68.3%.

The resin composition of Comparative Example 3 is tried to be formed into a film as in Example 1. However, due to the large amount of the added water-absorption polymer, it fails to be cured and formed into the film. Then, as in Example 1, the production of covering wire is tried, but the covering as the insulation layer is difficult to form well. Thus, the covered wire cannot be completed.

Comparative Example 4

In 100 parts by weight of the resin composition B, 2 parts by weight of a water-absorption polymer of the polyalkylene oxide system resin which is powdered into average particle diameter of 10 μm and contains 18 parts by weight of distilled water as adjusted 9 g/g in the amount of water absorption is agitated and dispersed. Thereby, a resin composition of Comparative Example 4 is obtained which is formed of a hydrated water-absorption polymer containing resin composition with moisture content of 15%.

Figure 10:
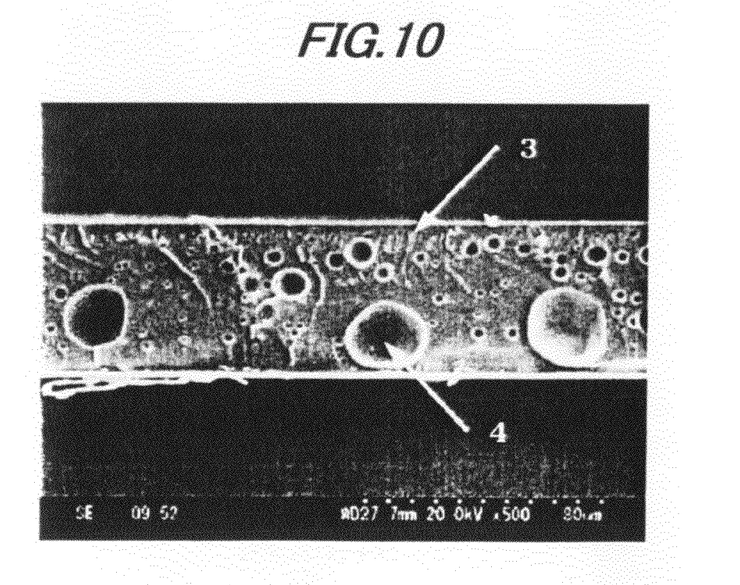
FIG. 10 is a photograph showing a cross section of a 50 μm thick film in Comparative Example 4.

The resin composition of Comparative Example 4 is formed into films as in Example 1. It is confirmed that the films have a good formability. After heating by the microwave, the 50 μm thick film has a porosity of 13% and a dielectric constant of 2.4. Due to the small amount of water absorption, the porosity lowers and the dielectric constant cannot be reduced sufficiently (See FIG. 10). On the other hand, in the 50, 100 and 200 μm thick films, the maximum diameter portion a and the minimum diameter portion b in void section are measured and all meet a/b≤2. Further, it is confirmed that void diameters D in the thickness direction are all less than ½t with respect to the film thickness t.

Then, as in Example 1, the covering wire is produced, and it is confirmed that voids are formed in the insulation layer. However, the insulation layer has porosity as low as 11.5%.

As in the film sample, the maximum diameter portion a and the minimum diameter portion b in void section are measured and it is confirmed that the voids meet a/b≤2. Further, it is confirmed that void diameters D in the thickness direction are all less than ½t with respect to the film thickness t.

Comparative Example 5

In 100 parts by weight of the resin composition B, 1 part by weight of a water-absorption polymer of the polyacrylate cross-linked polymer II which is powdered into average particle diameter of 10 μm and contains 110 parts by weight of distilled water as adjusted 110 g/g in the amount of water absorption is agitated and dispersed. Thereby, a resin composition of Comparative Example 5 is obtained which is formed of a hydrated water-absorption polymer containing resin composition with moisture content of 52.1%.

The resin composition of Comparative Example 5 is tried to be formed into a film as in Example 1. However, it is weak and not sticky such that it fails to be formed into the film. Then, as in Example 1, the production of covering wire is tried, but the covering as the insulation layer is difficult to form well. Thus, the covered wire cannot be completed.

Comparative Example 6

In 100 parts by weight of the resin composition B, 1 part by weight of a water-absorption polymer of the polyacrylate cross-linked polymer I which is powdered into average particle diameter of 25 μm and contains 59 parts by weight of distilled water as a saturation amount of water absorption is agitated and dispersed. Thereby, a resin composition of Comparative Example 6 is obtained which is formed of a hydrated water-absorption polymer containing resin composition with moisture content of 36.9%.

Figure 11:
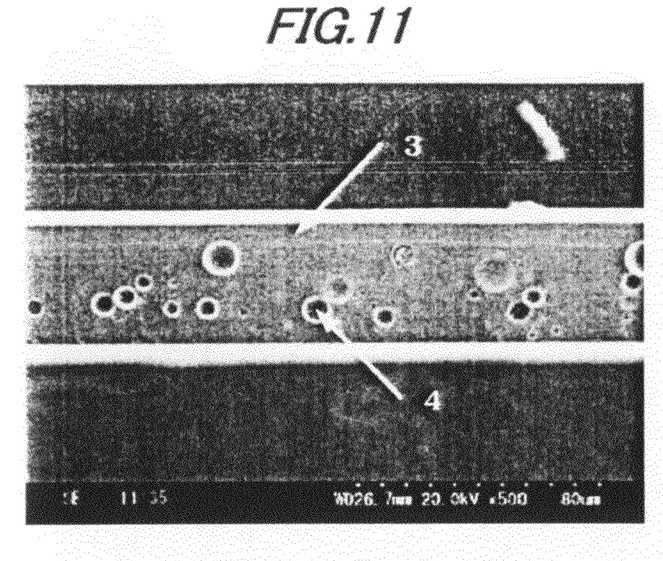
FIG. 11 is a photograph showing a cross section of a 50 μm thick film in Comparative Example 6.
Figure 12:
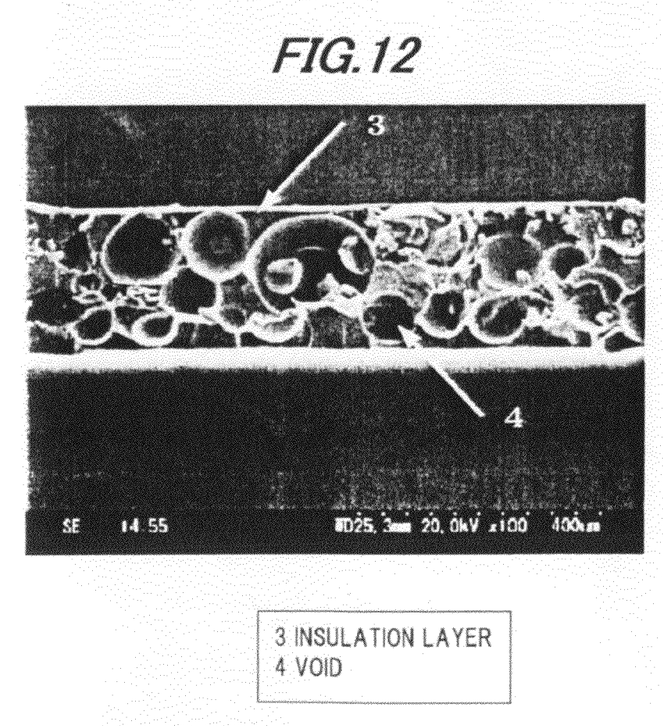
FIG. 12 is a photograph showing a cross section of a 200 μm thick film in Comparative Example 6.

The resin composition of Comparative Example 6 is formed into films as in Example 1. However, the 50 μm thick film has only a porosity of 3% and a dielectric constant of 2.65, where only few voids are formed in the insulation layer (See FIG. 11). This is, as in Comparative Example 1, because the water-absorption polymer is increased to 3 to 4 times in average particle diameter by absorption and swelling, so that it is difficult to pass through a gap (100 μm) of the 4 MIL blade. According as the gap increases in changing to 7 MIL and 15 MIL blades, the number of voids in the film increases. It is found that, as shown in FIG. 12, the 200 μm thick film has a porosity of 36% and a dielectric constant of 1.87 which is equivalent to the 50 μm thick film (with the same moisture content) in Example 7. In the 50, 100 and 200 μm thick films, the maximum diameter portion a and the minimum diameter portion b in void section are measured and all meet a/b≤2. However, it is confirmed that the 100 and 200 μm thick films have many void diameters D in the thickness direction more than ½t with respect to the film thickness t.

Then, as in Example 1, the covering wire is produced, but it is found that, as in the film sample, the insulation layer includes few hydrated polymer. The hydrated polymer is immediately clogged at a dice portion in the pressure coating bath to cause breaking of wire.

Comparative Example 7

In 100 parts by weight of the resin composition B, 5 parts by weight of a water-absorption polymer of the polyacrylate cross-linked polymer I which is powdered into average particle diameter of 3 μm and contains 295 parts by weight of distilled water as a saturation amount of water absorption is agitated and dispersed. Thereby, a resin composition of Comparative Example 7 is obtained which is formed of a hydrated water-absorption polymer containing resin composition with moisture content of 73.8%.

The resin composition of Comparative Example 7 is tried to be formed into a film as in Example 1. However, due to the high moisture content, it fails to be formed into the film. Then, as in Example 1, the production of covering wire is tried, but the covering as the insulation layer is difficult to form well. Thus, the covered wire cannot be completed.

Comparative Example 8

Using the low dielectric thermoplastic polymer, tetrafluoroethylene perfluoroalkyl vinylether copolymer (PFA), the insulation layer (50 μm) is tried to be extrusion-coated at a speed of 50 m/min by a 28 mm extruder on a stranded conductor 48 AWG (7/0.013 S-MF-AG alloy wire, Hitachi Cable, Ltd.) while injecting liquefied carbon dioxide. However, breaking of wire occurs frequently and the porous (foamed) covered wire cannot be completed.

As described in the above Examples, the porous body or porous body covered wires can be easy obtained by being hydrated by heating after curing the hydrated water-absorption polymer containing resin composition that is prepared by dispersing the water-absorption polymer with water preliminarily absorbed in the liquid cross-link curable resin composition. Further, since the particle diameter and the amount of water absorption of the water-absorption polymer is properly adjusted in the liquid cross-link curable resin composition, the thin and small-diameter porous body covered wire can be easily made without breaking the wire. On the other hand, in Comparative Examples 1 and 6, due to the large particle size of the water-absorption polymer, the thinned film cannot be obtained. In Comparative Examples 3, 5 with the large amount of water absorption, Comparative Example 7 with the high moisture content, and Comparative Example 2 with the large amount of the added water-absorption polymer, the film formability lowers significantly. In Comparative Example 4 with the small amount of water absorption and low moisture content, though the film can be formed, the dielectric constant cannot be reduced sufficiently due to the low porosity. In Comparative Example 8 using the conventional extrusion system, the porous covered wire cannot be formed at high speed.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method of making an insulated wire, said method comprising:
   coating a perimeter of a conductor with a liquid crosslink-curable resin composition containing an aqueous absorbent polymer dispersed therein to provide an insulating layer around the conductor, the aqueous absorbent polymer comprising a pre-absorbed water-swollen absorbent polymer;
   cross-linking the aqueous absorbent polymer-containing liquid crosslink-curable resin composition to provide a cured insulating layer; and
   heating the cured insulating layer to remove moisture in the aqueous absorbent polymer to faint voids in the insulating layer, wherein the aqueous absorbent polymer has an average particle diameter of 10 µm or less before swelling, an amount of water absorption of the aqueous absorbent polymer after swelling in a range from 10 g/g to 100 g/g, and the aqueous absorbent polymer-containing liquid crosslink-curable resin composition has a moisture content in a range from 25% to 65%, thereby a size and a shape of the voids in the insulated layer are controlled.

2. The method according to claim 1, wherein the aqueous absorbent polymer-containing liquid crosslink-curable resin composition is heated by a microwave.

3. The method according to claim 1, wherein an amount of the aqueous absorbent polymer is 0.1 parts by weight to 10 parts by weight in 100 parts by weight of the resin composition.

4. The method according to claim 1, wherein an amount of the aqueous absorbent polymer is 0.5 parts by weight to 3 parts by weight in 100 parts by weight of the resin composition.

5. The method according to claim 1, wherein the liquid crosslink-curable resin composition comprises an ultraviolet or a heat-curable liquid resin composition.

6. The method according to claim 1, wherein the insulating layer has a thickness of not more than 100 µm and a porosity of 20 to 60%.

7. The method according to claim 1, wherein each of the voids in the insulating layer is substantially circular in a cross section, has a maximum to minimum diameter ratio of not more than 2, and a diameter D in a thickness direction of D<½t, where t is a thickness of the insulating layer.

8. The method according to claim 1, wherein the size and the shape of the voids are adjusted by the average particle diameter and the amount of water absorption of the aqueous absorbent polymer.

9. The method according to claim 1, wherein said crosslinking comprises heating the insulating layer to form the cured insulating layer.

10. A method for making a porous material, the method comprising:
dispersing a pre-absorbed water-swollen aqueous absorbent polymer into a liquid crosslink-curable resin composition to form a dispersed aqueous absorbent polymer-containing liquid crosslink-curable resin composition;
coating the dispersed aqueous absorbent polymer-containing liquid crosslink-curable resin composition onto a sheet to provide an insulated layer around the sheet;
crosslink-curing the dispersed aqueous absorbent polymer-containing liquid crosslink-curable resin composition to provide a cured aqueous absorbent polymer-containing resin composition; and
subsequently heating the cured aqueous absorbent polymer-containing resin composition to remove moisture in the aqueous absorbent polymer dispersed in the resin composition to form voids in the resin composition,
wherein the aqueous absorbent polymer has an average particle diameter of 10 µm or less before swelling, an amount of water absorption of the aqueous absorbent polymer after swelling in a range from 10 g/g to 100 g/g, and the aqueous absorbent polymer-containing liquid crosslink-curable resin composition has a moisture content in a range from 25% to 65%, thereby a size and a shape of the voids in the insulated layer are controlled.

11. The method according to claim 10, wherein the liquid crosslink-curable resin composition comprises an ultraviolet or a heat-curable liquid resin composition.

12. The method according to claim 10, wherein the aqueous absorbent polymer-containing liquid crosslink-curable resin composition is heated by a microwave.

13. The method according to claim 10, wherein an amount of the aqueous absorbent polymer is 0.1 parts by weight to 10 parts by weight, relative to 100 parts by weight of the liquid crosslink-curable resin composition.

14. The method according to claim 10, wherein an amount of the aqueous absorbent polymer is 0.5 parts by weight to 3 parts by weight, relative to 100 parts by weight of the liquid crosslink-curable resin composition.

15. The method according to claim 10, wherein each of the voids in the insulating layer is substantially circular in a cross section, and has a diameter D in a thickness direction of D<½t, where t is a thickness of the resin composition.

* * * * *